United States Patent [19]

Mimura et al.

[11] Patent Number: 5,170,441
[45] Date of Patent: Dec. 8, 1992

[54] APPARATUS FOR DETECTING REGISTRATION ERROR USING THE IMAGE SIGNAL OF THE SAME SCREEN

[75] Inventors: Itaru Mimura, Sayama; Naoto Tomura, Niiza, both of Japan

[73] Assignee: Hitachi Denshi Kabushiki Kaisha, Tokyo, Japan

[21] Appl. No.: 668,245

[22] Filed: Mar. 12, 1991

[30] Foreign Application Priority Data

Mar. 14, 1990 [JP] Japan .................................. 2-061052

[51] Int. Cl.$^5$ ............................................. G06K 9/32
[52] U.S. Cl. ...................................... 382/45; 382/44; 358/153; G06K/9/32
[58] Field of Search ...................... 382/41, 42, 44, 45, 382/48, 54; 358/80, 133, 135

[56] References Cited

U.S. PATENT DOCUMENTS

| | | | |
|---|---|---|---|
| 4,685,146 | 8/1987 | Fenster et al. | 382/44 |
| 4,858,128 | 8/1989 | Nowak | 382/44 |
| 5,046,179 | 9/1991 | Uomori et al. | 382/42 |

FOREIGN PATENT DOCUMENTS 285590 11/1987 Japan .

Primary Examiner—Jose L. Couso
Attorney, Agent, or Firm—Antonelli, Terry, Stout & Kraus

[57] ABSTRACT

A registration error detection apparatus which includes a circuit that sums up, for a plurality of adjacent pixels, absolute values of differences between a plurality of image component signals which form a same frame of picture, a circuit which detects the registration error based on the minimum value of the output signals provided by the summing circuit, a first evaluating circuit which evaluates the reliability of the detection result of registration error based on the differential signal between an input test signal and an input reference signal, a second evaluating circuit which evaluates the reliability based on differences between the average value of registration error and individual detection results, a third evaluating circuit which calculates the statistic deviation value of the BPF-processed test signal and the reference signal and evaluating the reliability based on the calculation result, and a circuit which makes a final judgement as to whether the detection result is to be accepted or rejected, based on the results of reliability judgement made by the first through third evaluating circuits.

9 Claims, 10 Drawing Sheets

| i | j | RESULT OF SUM |
|---|---|---|
| 1 | 1 | SUM 1 |
| 1 | 2 | SUM 2 |
| 1 | 3 | SUM 3 |
| 1 | 4 | SUM 4 |
|   |   |   |
| I | J | SUM 5 |

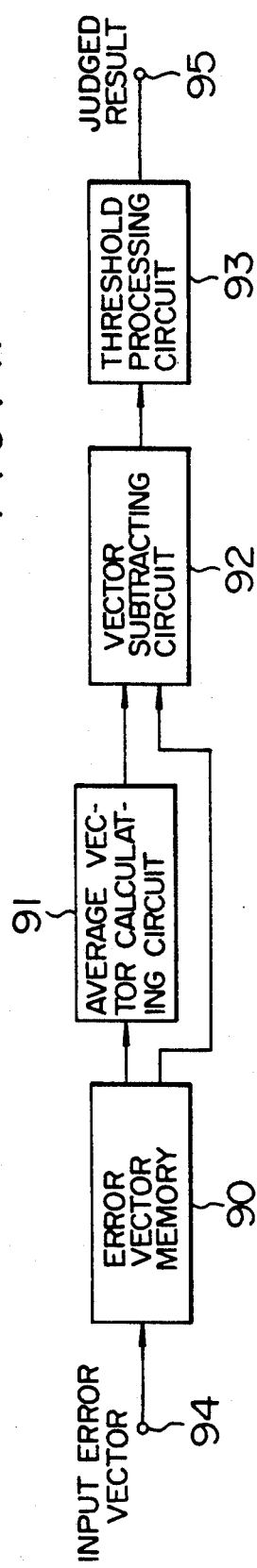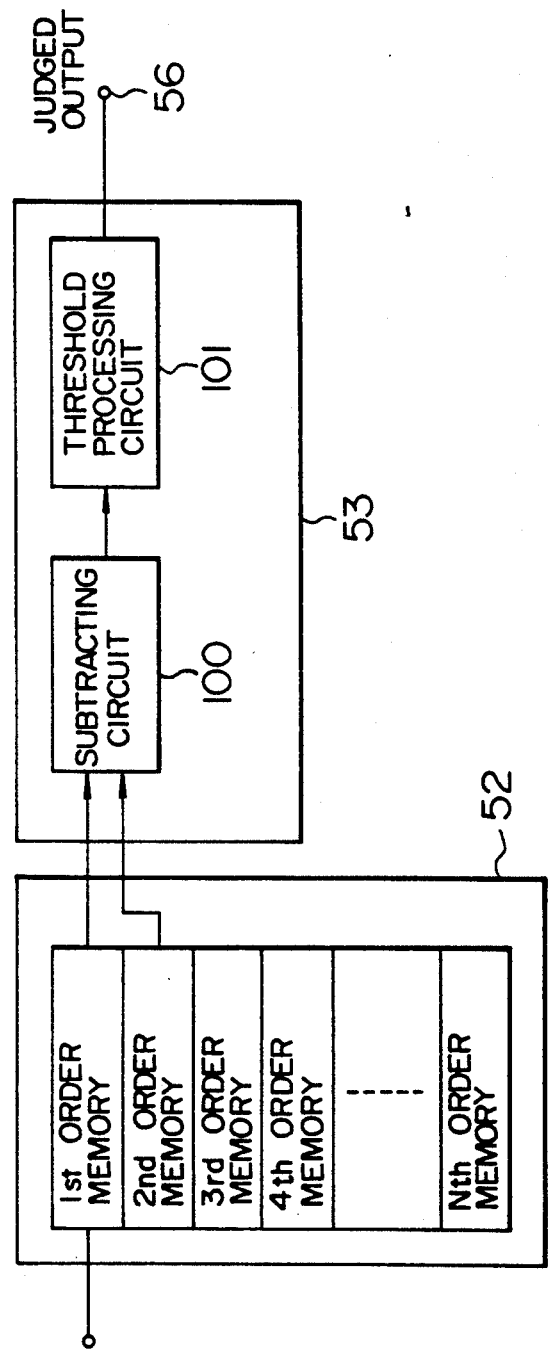

APPARATUS FOR DETECTING REGISTRATION ERROR USING THE IMAGE SIGNAL OF THE SAME SCREEN

BACKGROUND OF THE INVENTION

This invention relates to an apparatus for detecting registration error, and more particularly to an apparatus of a color imaging apparatus or color display apparatus for fast detecting displacement among a plurality of video signal components such as red, blue or green signals which constitute a video signal generated during the usual imaging or displaying operation, in a "registration error" for registration correction of a color television camera, or convergence correction of a color image pickup tube, or the like.

In a color television camera, which divides a color signal representing an object into three primary color signals (red (R), green (F) and blue (B) signals) and picks up the primary color signals by using a plurality of image pickup tubes, a registration correction function is necessary for superimposing all the color signals precisely.

Even in a color television camera with a computer-based automatic registration correction system, conventional registration correction is carried out after aging of the camera for a long period and after the circuit has settled in a stable condition. This is because a registration state immediately after power is turned on varies due to thermal drift of a deflection circuit and thermal deformation of lens and prism, as the time elapses.

In a conventional registration error detection method a chart is used. Registration error is detected in advance of operation of the camera, and a correction is performed on assumption that the registration state does not fluctuate during the operation. However, even after a sufficient aging, there arise: (1) a variation of terrestrial magnetism depending on the directivity of the camera, and (2) a variation of magnification chromatic aberration of its lens caused by change in a zoom ratio. Therefore, an amount of registration error which has been detected initially does not necessarily adequately correspond to the operating state. On this account, it is not possible to keep the best registration state invariably.

In order to overcome the above-mentioned problems, there is disclosed a method of detecting registration during the operation and correcting the registration immediately upon the occurrence of a registration error, in Japanese Patent Publication (JP-A-62-285590). The conventional technology is based on calculation of correlation between the R or B signal and the G signal, and detection of a shift value associated with the maximum correlation value for evaluating the registration error.

A usual object to be imaged have colors, and registration error is not necessarily detected accurately due to influence of signals of the colors. Based on this reason, the colors of the object are detected and the detection result of the registration error for a picture with abundant colors is excluded, thereby to prevent increasing registration error caused by the detection error.

In the above-mentioned conventional technology, a video signal constituting a television image is coarsely sampled and the sampling density is increased by means of interpolation of the signal. Then the correlation function of the interpolated video signal is calculated, and the interpolation is repeated, thereby to detect the registration error at intended accuracy. The accuracy of interpolation operation directly influences the detection accuracy of the registration error, and it is necessary to use a multiplier with many bits for dealing with the intricate operation. As mentioned above, although the technique of the patent publication features to use a smaller number of sample points for detection of the registration error, it is not necessarily suitable for a fast operation, since the interpolating operation is used. Moreover, a multiplier is used for calculation of the correlation, in digital signal processing, resulting in an increased scale of circuitry and higher cost.

The method of discriminating legitimacy of a signal generated upon the detection of the registration error described in the above-mentioned conventional technology is applied only to objects with abundant colors, and other causes of erroneous detection include noises, out-focusing, etc. Therefore, sufficient reliability cannot be attained through the color-based judgement alone.

SUMMARY OF THE INVENTION

Accordingly, a first object of this invention is to provide means for detecting the registration error of a picture, which means is simple, economical and suitable for digital processing.

A second object of this invention is to provide a registration error detecting apparatus having superior reliability, and a color picture imaging apparatus and color picture display apparatus using the registration error detecting apparatus.

In order to achieve the above objects, the present apparatus uses means for calculating correlation without using a multiplier, and a plurality of evaluating means for evaluating the reliability of a result of the registration error detected from the calculated correlation. More specifically, the correlation is calculated by using means for summing absolute values of differences between a plurality of picture component signals in a frame of picture for a plurality of contiguous pixels.

As means for preventing erroneous detection of the registration error, at least one of: (1) evaluating means for discriminating the number of colors from the image component signals to abandon the detection result from image portions having abundant colors, (2) evaluating means for evaluating a statistic deviation value of a signal component of an image signal in the specific frequency band, (3) evaluating means for respectively averaging for each of divided areas of a screen, registration error values represented by two image component signals obtained from an evaluation function similar to the correlation, and evaluating the difference of individual registration error values from the averaged registration error values, and (4) evaluating means for examining the relation between a registration error value associated with the maximum correlation value obtained from the evaluating function and each of registration error values associated with lower correlation values than the maximum correlation value—is employed to determine whether or not the result of the registration error detected from the evaluating function is to be accepted.

According to this invention, the means for detecting the correlation is designed to sum differential absolute values between a plurality of image component signals for the same frame of a picture.

In the means, one of two image component signals is read out with a small shift for the other, image areas of a given size are provided at positions determined from a value of the shift, and a differential signal between the image component signals are summed over the image areas to determine as the registration error value, the shift value when the sum becomes minimum. Therefore, a complex multiplying circuit is not required. A reliability judgement circuit operates to abandon the detection result of the registration error when there is a possibility that an error is included in the detection result, and thereby it functions to prevent erroneous registration correction. Using portions of two image component signals in the specific frequency band is useful for extraction of an edge signal which is suitable for the registration detection and accurate calculation of a statistic deviation value. The means for calculating deviation functions determines presence or absence of the edge signal in the specific frequency band. The means for evaluating the difference between the average value for each of a plurality of areas and each detected error value, serves to remove detected error values with a large difference from the average value. The means for evaluation relation between an error value associated with the maximum correlation and each error value associated with lower correlations, evaluates a degree of the maximum correlation and degrees of lower correlations, and serves to abandon the detection result if there is no significant difference between the maximum correlation and the lower correlations. By using the above-mentioned means, the registration error can readily be detected, and the erroneous operation due to erroneous detection can be prevented by judging of reliability of the detection result.

BRIEF DESCRIPTION OF THE DRAWINGS

FIG. 17 shows a block diagram of a circuit for judging the reliability obtained from an average error vector;

FIGS. 18 and 19 are block diagrams showing arrangements of a reliability judging circuit 53 shown in FIG. 10;

DESCRIPTION OF THE PREFERRED EMBODIMENTS

Figure 1:
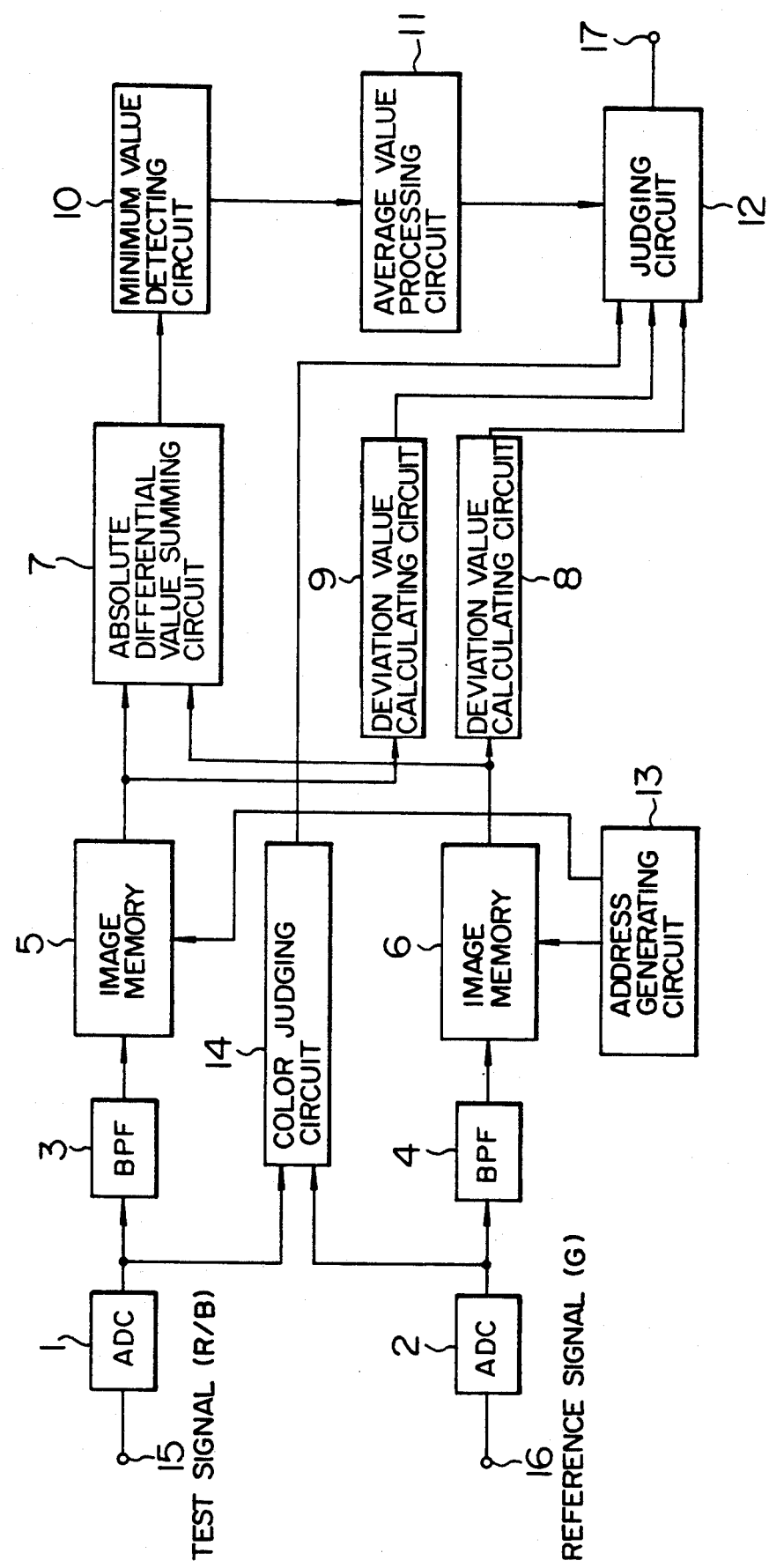
FIG. 1 is a block diagram of a registration error detecting apparatus according to this invention.

FIG. 1 is a block diagram for showing an arrangement of a registration error detecting apparatus according to an embodiment of this invention.

The apparatus includes analog-to-digital converters (to be simply referred to as ADCs hereinafter) 1 and 2, band-pass filters (to be simply referred to as BPFs hereinafter) 3 and 4, image memories 5 and 6, an absolute differential value summing circuit 7, a color judging circuit 14, deviation value calculating circuits 8 and 9, a minimum value detecting circuit 10, an average value processing circuit 11, a judging circuit 12, and an address generating circuit 13.

The ADCs 1 and 2 convert a test analog signal inputted from a terminal 15 and a reference analog signal inputted from a terminal 16 into digital signals, respectively. In this embodiment, of the three primary color signals that are image component signals for the same image, a red (R) or blue (B) signal is used as the test signal, and a green (G) signal is used as the reference signal. Namely the test and reference signals are components of an image signal that forms the same frame of the image.

The BPFs 3 and 4 function to suppress low-frequency and high-frequency components of the image component signals, respectively. The details of the BPFs 3 and 4 will be explained later. The image memories 5 and 6 store the test and reference data represented by the band-limited digital test signal and reference signal, respectively. The summing circuit 7 calculates an evaluation function analogous to a cross-correlation function from the test data stored in the image memory 5 and the reference data stored in the image memory 6. The detecting circuit 10 detects a minimum value of an output from the summing circuit 7 and a registration error from a shift amount that gives the minimum value. The address generating circuit 13 is for controlling the read addresses of the test and reference data as image data stored in the image memories 5 and 6. The method of reading out the image data will be explained later in connection with the method of calculating the evaluation function analogous to the cross-correlation function.

The judging circuit 12 is for evaluating the reliability of the detecting result of the registration error from a differential signal between the inputted test and reference signals. The processing circuit 11 evaluates the reliability of the registration error from differences between an average value and individual values of registration error values. The calculating circuits 8 and 9 calculate the statistic deviation values of the test and reference signals which have been subjected to the BPF processing, and evaluate the reliabilities of the registration errors from the results of the calculation. The judging circuit 12 is for finally judging use or abandonment of the detected registration error from the evaluating results of the reliability of the registration error on the color signal, deviation value and average value processing.

Figure 2:
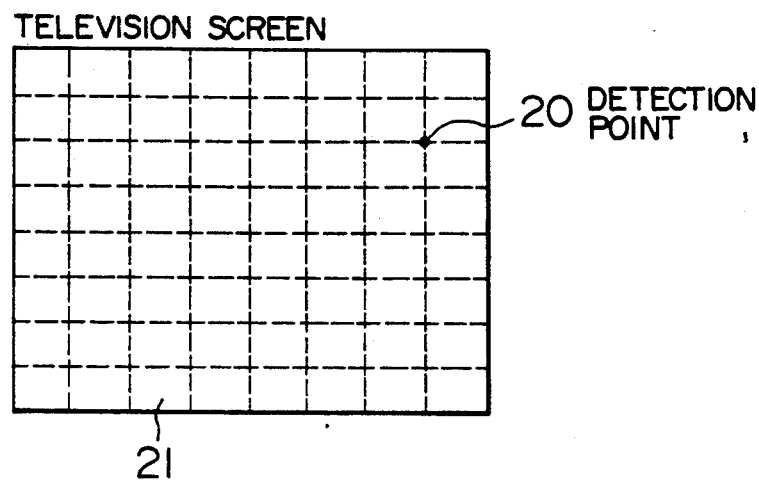
FIGS. 2, 3A and 3B are diagrams showing screen positions at which the registration error is detected.

FIG. 2 is a diagram showing positions of a television screen for the registration error to be detected.

The detection of the registration error may be carried out for all pixel points corresponding to the television screen, or may be carried out for blocks into which the television screen is divided, as shown in FIG. 2. A detection point 20 in the figure is an example. Effects can be obtained that a calculation amount can be reduced due to the division of the screen into the blocks. The registration error can be detected in a short time, variation of the registration is relatively moderate in the screen area, and reducing the number of detection points imposes no practical problem.

Figures 3A, 3B:
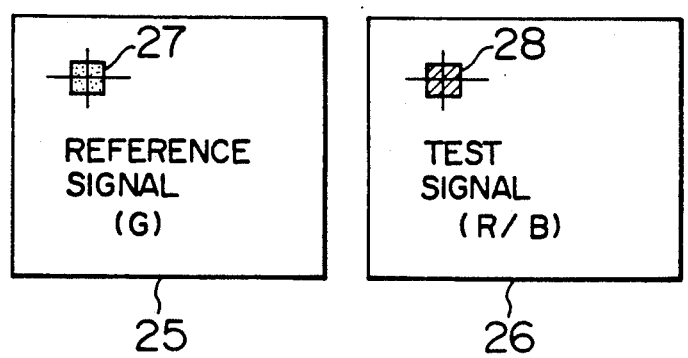
Figure 4:
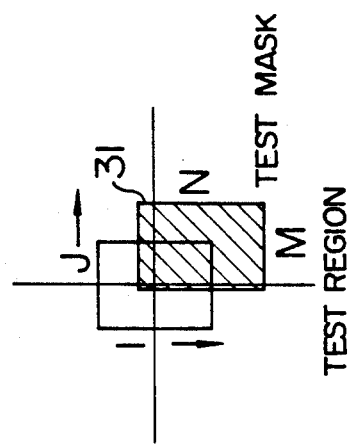
FIGS. 4, 5 and 6 are diagrams showing a model of a procedure for calculation of correlation.
Figure 5:
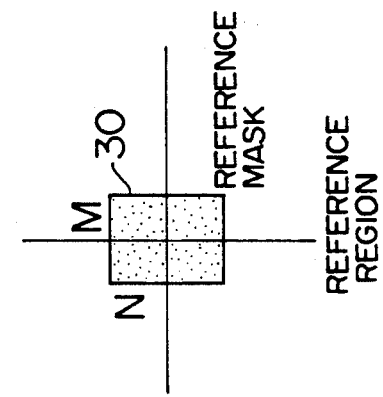
Figure 6:
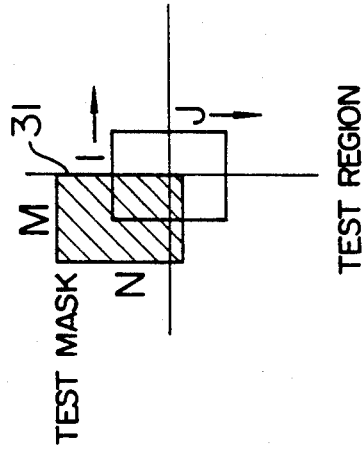

Next, the method of calculating the cross-correlation will be explained with reference to FIGS. 3, 4, 5 and 6. The detection of the registration error is carried out by defining regions 27 and 28 at substantially the same position for the test and reference signals, as shown in FIGS. 3A-3B. For the cross-correlation calculation, a test mask 31 of M×N pixels is provided around a detection point for the test signal, as shown in FIG. 4. Similarly, a reference mask 30 of M×N pixels is provided around a detection point for the reference signal, as shown in FIG. 5. Absolute values representing differences between the test and reference signals for the pixels of the test and reference masks 30 and 31 are calculated, and the obtained absolute differential values are summed up with respect to each pixel of the mask region (M×N pixels). Subsequently, the test mask is shifted by one pixel, and new differential absolute values are summed up again. In this manner, absolute differential values are summed up while shifting the test mask 31 one pixel by one pixel. For example, the test mask is shifted on a two-dimensional plane in a direction from a top left shown in FIG. 4 to a bottom right shown in FIG. 6. In FIGS. 4 and 6, the direction of the shift is denoted by "I" in horizontal and "J" in vertical. A region of this shift is preferably set equal to or slightly larger than a maximum registration error. The foregoing procedure is expressed by the following formula (1).

$$CORR(i,j) = \sum_{j=1}^{N} \sum_{i=1}^{M} ABS(TEST(x+i, y+j) - REF(x,y)) \quad (1)$$

where CORR(i,j) is the cross-correlation evaluating function, TEST(x,y) is the test signal, REF(x,y) is the reference signal, and ABS( ) is calculation of an absolute value.

The image memories 5 and 6 of FIG. 1 may store image data for the whole screen, or may store only image data around a detection point when the screen is divided into the blocks, and the masks are provided, as mentioned above. The test data of the test signal is read out in plural times while the address is changed. The reference data of the reference signal is read out in synchronism with the test data. The generating circuit 13 of FIG. 1 controls read out of the test and reference data from the image memories 5 and 6, as explained above.

Figure 7:
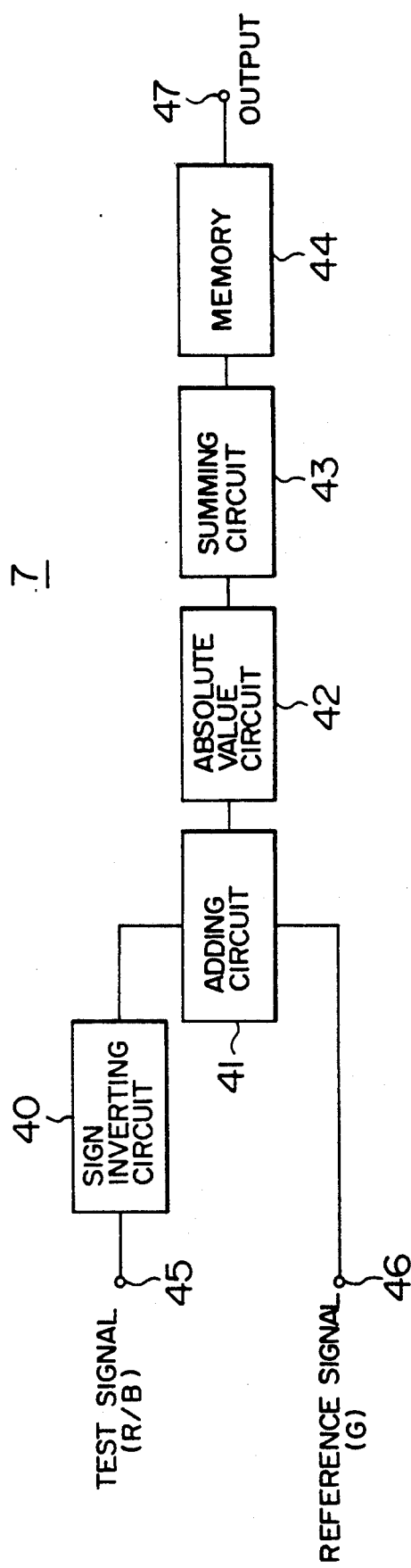
FIG. 7 is a block diagram showing an arrangement of a differential absolute value summing circuit shown in FIG. 1.
Figures 8, 9:
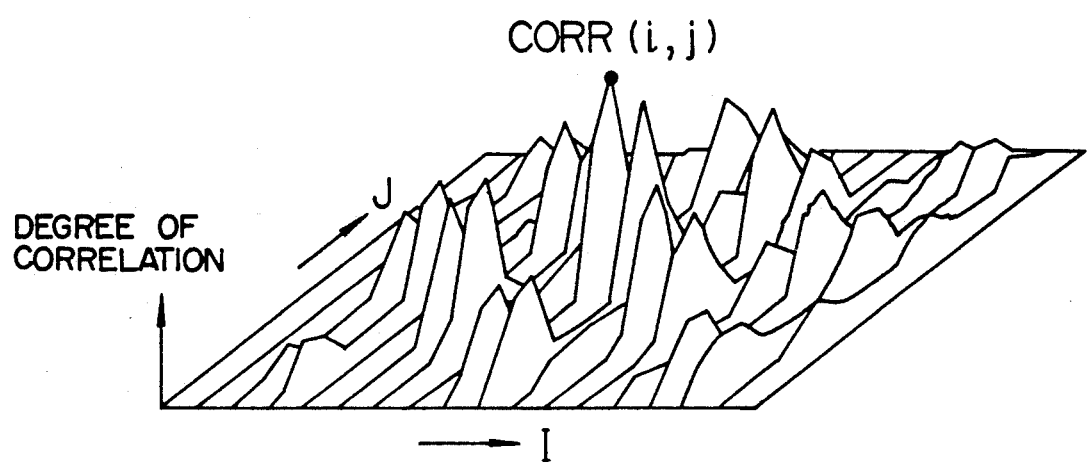
FIG. 8 is a diagram showing stored correlation values.
FIG. 9 is a diagram showing a result of the correlation calculation displayed in a quasi-three-dimensional space.

FIG. 7 is a block diagram showing an arrangement of the absolute differential value summing circuit 7 in FIG. 1. The summing circuit 7 includes a sign inverting circuit 40, an adding circuit 41, an absolute value circuit 42, a summing circuit 43, and a memory 44. Signals representing the test and reference masks are inputted to terminals 45 and 46, respectively. The inputted reference mask signal is fed directly to the adding circuit 41, while the test mask signal is fed to the adding circuit 41 after its sign is inverted. The adding circuit 41 adds these inputted signals, thereby generating a differential signal between both the inputted signals. An output of the adding circuit 41 is processed by the absolute value circuit 42, and then summed up by the summing circuit 43. A region of the sum is the set mask region explained in FIGS. 4 and 6. As shown in FIG. 8, results of the sum (to be referred to as SUM 1 to SUM N) are stored in the memory 44, for example. Each sum result is preferably stored in a memory location which corresponds to the shift values i and j. FIG. 9 shows the calculated sums displayed in a quasi-three-dimensional space. Although a sum absolute differential values is smaller for a shift value with stronger cross-correlation between images, the sum is displayed such that a smaller sum has stronger correlation. The shift value having the maximum correlation, as indicated by CORR(i,j) in FIG. 9, is detected as the registration error. Although the foregoing correlation detection method is different from a normal cross-correlation calculation method using multiplication, the accurate detection of the registration error was confirmed by the computer-based image simulation.

Figure 10:
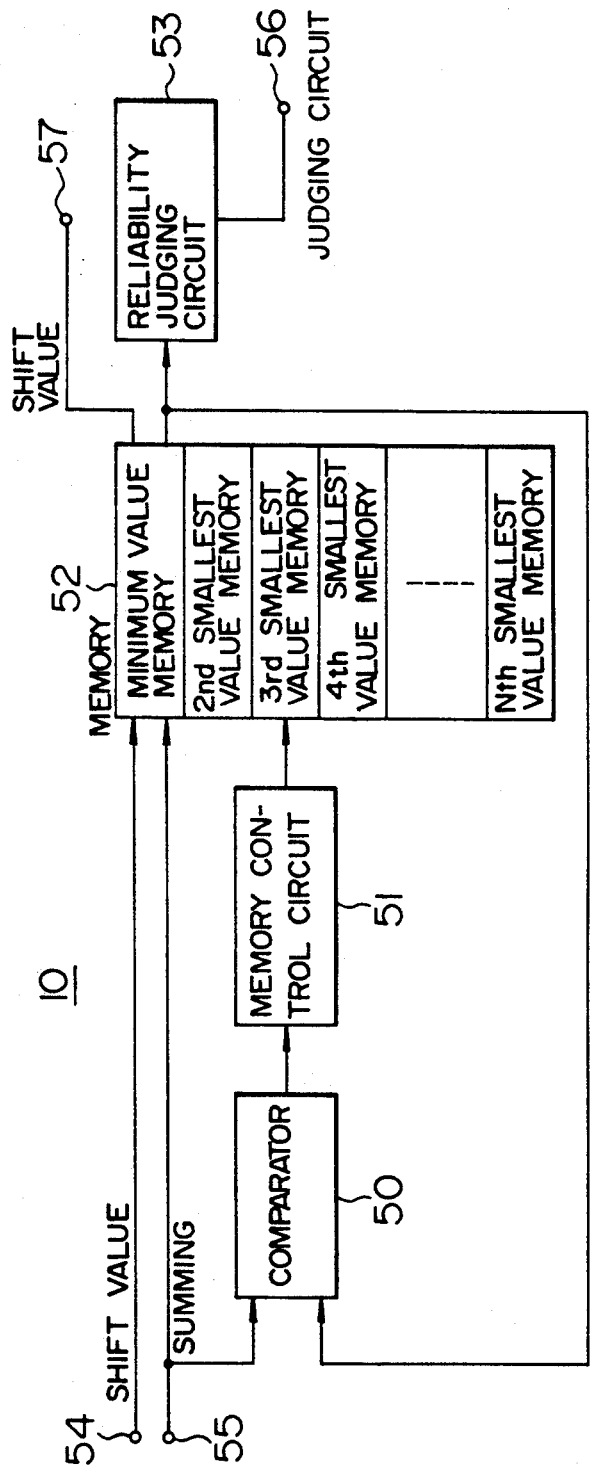
FIG. 10 is a block diagram showing an arrangement of a minimum value detecting circuit 10 shown in FIG. 1.

FIG. 10 is a block diagram showing an arrangement of the minimum value detecting circuit 10 in FIG. 1. The detecting circuit 10 detects a shift value for the maximum correlation. The detecting circuit 10 includes a comparator 50, a memory control circuit 51, a memory 52, and a reliability judging circuit 53. The detecting circuit 10 inputs from an input terminal 55 the sums which has been calculated by the summing circuit of FIG. 7. At the same time, the circuit 10 inputs the shift value (i,j) from another terminal 54. The memory 52 stores N sums in order of larger sum, together with the associated shift values. The comparator 50 compares a newly inputted sum with each sum stored in the memory 52 to determine whether or not the inputted sum is larger than each sum stored. The control circuit 51 changes the memory contents in accordance with the determining result. This processing is called the sorting operation for the memory contents. Consequently, the memory 52 always stores N sums in order of larger sum and their associated shift values. Although it is only necessary for the detection of the registration error to hold a minimum sum and a shift value associated with the minimum sum, the second smallest sum and other larger sums and the associated shift values are also held for the reliability judgement of the detection result of the registration error. An arrangement of the judging circuit 53 and its operation and a method of reliability judgement will be explained later. After the comparison is performed over all search regions, a minimum shift value (i,j) is outputted as the registration error to an output terminal 57. The detection of registration error explained above is carried out for each block on the screen.

Next, means for judging the reliability of the detected registration error, i.e., means for removing a detection error of the registration error will be explained. In a case of detection of the registration error from an image signal generally, the detection error is often introduced into the detected registration error.

If correction is performed based on an erroneous registration error, the registration accuracy is lowered and the picture quality is degraded. Therefore, perfect detection accuracy is desirable. However, when there is less cross-correlation between the reference signal and test signal, e.g., an image has abundant colors, the cross-correlation cannot be detected. Even in case of a monochromatic object, the cross-correlation cannot be detected in many cases from a video signal in which a high-frequency video signal is lack.

Figure 11:
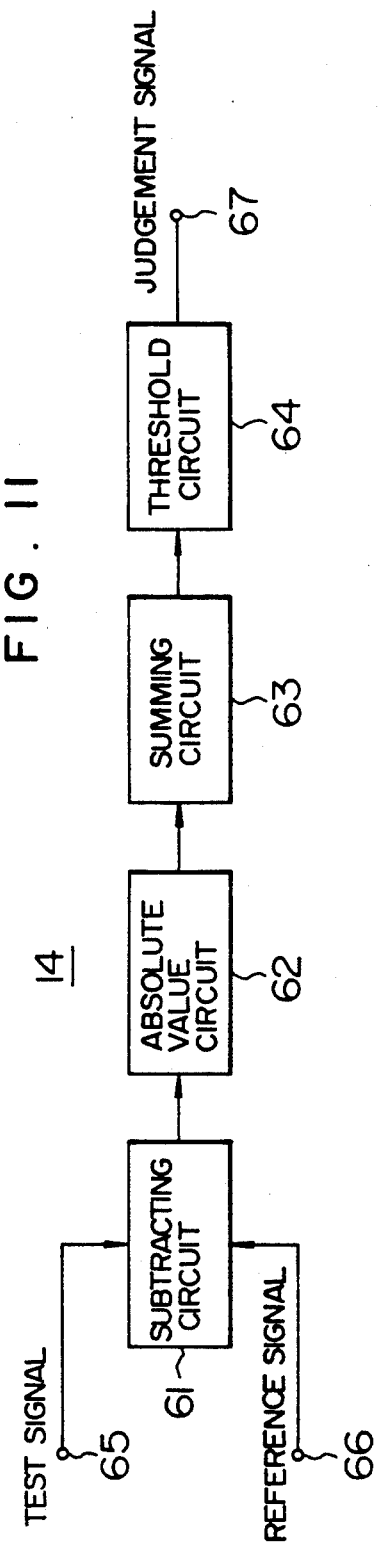
FIG. 11 is a block diagram showing another arrangement of the circuit 10 shown in FIG. 1.

Initially, a circuit for removing a detection error due to colors will be explained. FIG. 11 is a block diagram showing an arrangement of the color judging circuit 11 in FIG. 1. The judgings circuit 11 includes a subtracting circuit 61, an absolute value circuit 62, a summing circuit 63, and a threshold circuit 64. The subtracting circuit 61 receives the reference and test signals from its input terminals 66 and 65, respectively, and performs subtraction for these received signals. From the results of subtraction, a sum of absolute differential values is obtained by the circuits 62 and 63. When the object is colorful, there is a great difference between the test signal (R/B signal) and the reference signal (G signal), resulting in the sum being great. A signal representative the sum as a color signal is processed by the threshold circuit 64, which determines the reliability of the detected registration error to be low when the color signal is large and outputs to an output terminal 67 a judgement signal representing that the detected registration error is to be abandoned. It should be noted that a region for the color signal to be judged may be as wide as the mask of $M \times N$ pixels for calculating the correlation.

Next, the reliability judgement for the detected registration error based on the deviation calculation will be explained. In order to detect the registration error from the cross-correlation, the cross-correlation function desirablely has a sharp peak. This means that the image signal needs to include a high-frequency component. The image signal with no high-frequency component often results in erroneous detection.

On this account, in the embodiment shown in FIG. 1, the BPFs 3 and 4 and the calculating circuits 8 and 9 are used to evaluate the frequency of the image signal. The BPFs 3 and 4 has functions for suppressing a d.c. component of the image signal and a function for narrowing band width of the image signal by cutting off its unnecessary high-frequency component. The deviation value calculated from the BPF-processed signal is large only when a signal component exists in pass band width of the processed signal. Accordingly, in a case of a large deviation value, the deviation value is regarded to be suitable for the correlation calculation and therefore, the detected registration error is used.

Figure 12:
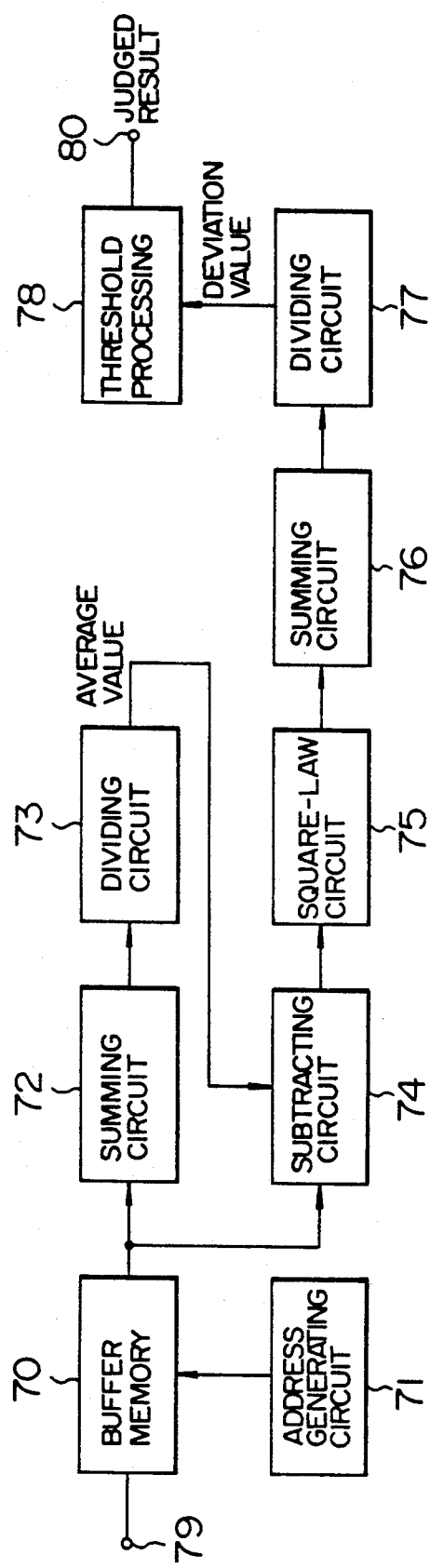
FIGS. 12, 13, 14 and 15 are diagrams showing arrangements of deviation value calculating circuit 8 (or 9) shown in FIG. 1.

FIG. 12 is a block diagram showing an arrangement of the deviation value calculating circuit 8 or 9 in FIG. 1. The calculating circuit includes a buffer memory 70, summing circuits 72 and 76, dividing circuits 73 and 77, a subtracting circuit 74, a square-law circuit 75, an address generating circuit 71, and a threshold circuit 78. Data representative of a signal which has been subjected to the functions of the BPF is temporarily stored in the buffer memory 70. Initially, he summing circuit 72 and dividing circuit 73 are used to obtain an average value of the stored data corresponding to a signal in the mask region. Subsequently, the stored data is read out of the buffer memory 70 again and fed to the subtracting circuit 74 together with the average value to generate a differential signal representative of the subtracting results. The differential signal is then fed to the square-law circuit 75. The summing circuit 76 sums the squared signal by the square-law circuit within the mask region, and then the statistic deviation value is calculated by the dividing circuit 77. The resulting deviation value is subjected to the threshold value processing for the reliability judgement from the degree of deviation. The threshold processing circuit 78 outputs a signal representative of use of the detected registration error to an output terminal 80 only when the deviation value is large. It is possible for the buffer memory 70 in FIG. 12 to be substituted by the image memory 5 (or 6) in FIG. 1.

Figure 13:
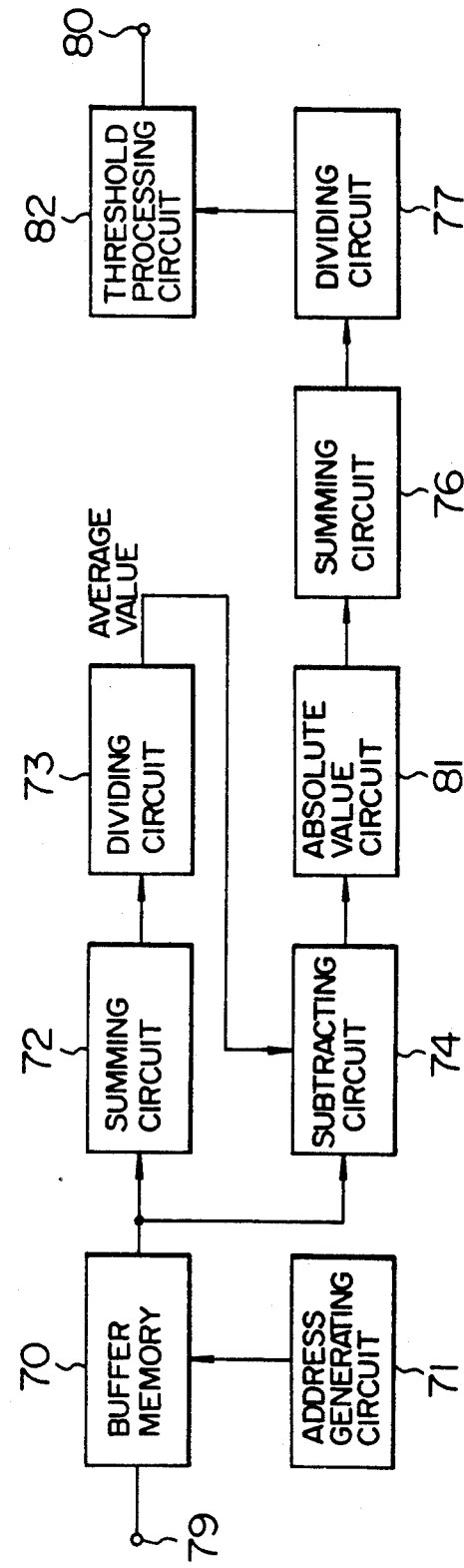
Figure 14:
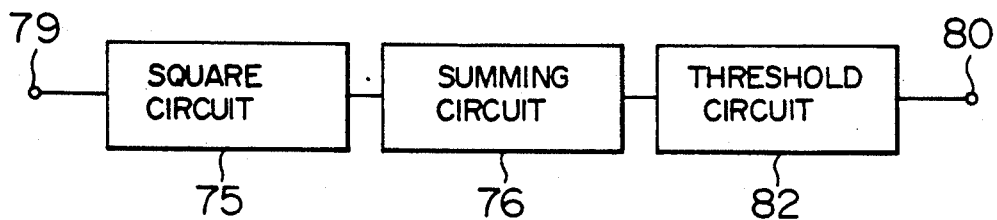
Figure 15:
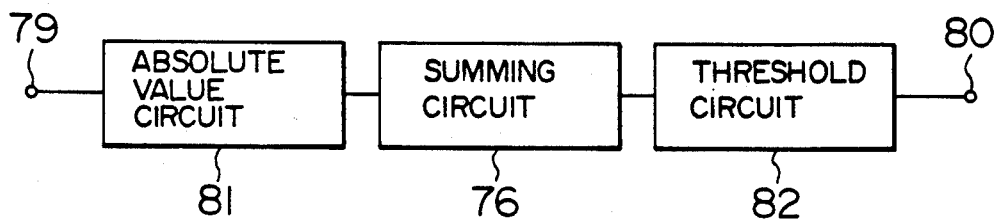

FIG. 13 is a block diagram showing an arrangement of the deviation calculating circuit 8 or 9 in FIG. 1. A square-law circuit 75 with a multiplier used in FIG. 12 is replaced by an absolute value circuit 81 without a multiplier in an arrangement of FIG. 13, allowing the reduction of circuit complexity. Although the calculating circuits 8 of FIG. 12 and FIG. 13 includes the dividing circuits 73 and 77, a dividing operation can be simply accomplished by a bit shift operation through selection of the number of summations, i.e., the size of matrix $M \times N$ to be 2 to arbitrary power. When the threshold value is multiplied by $M \times N$ than the original value the dividing circuits 73 and 77 are not necessary. When the BPFs 3 and 4 are provided with many taps and have a sharp cut-off characteristics so that the d.c. component is completely suppressed, the average value calculating circuit becomes unnecessary, and the input signal can be processed directly by the square-law circuit 75 or absolute value circuit 81, as shown in FIG. 14 and FIG. 15.

Figure 16:
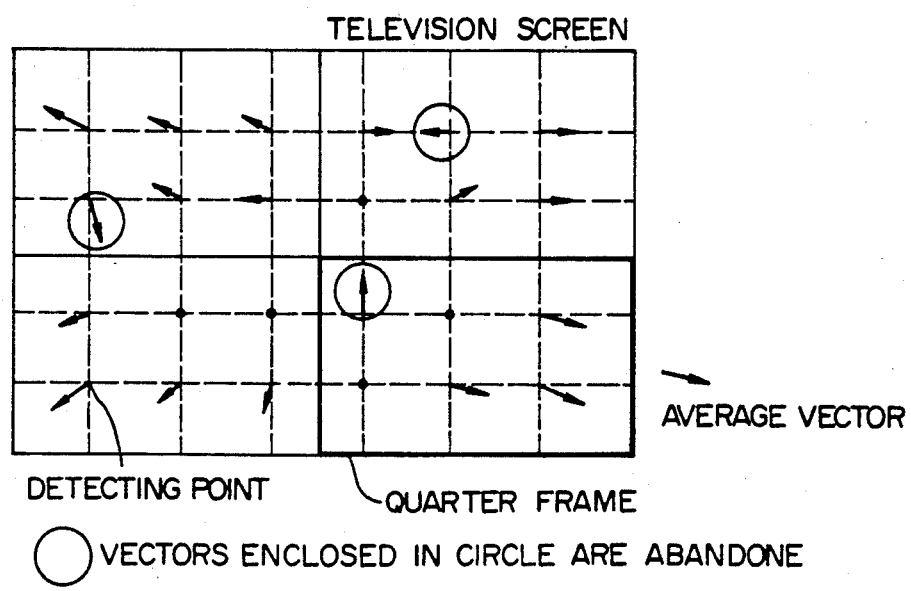
FIG. 16 is a diagram showing detected error vectors.

Next, means of reliability judgement based on the averaging operation of the registration deviations will be explained. Variation of registration during the operation is caused by variation in the terrestrial magnetism, the magnification chromatic aberration of lens, or the like, in the nature of these error attributions, adjacent blocks are conceived to have high similarity. As shown by a model shown in FIG. 16, adjacent blocks have their degrees of error (to be referred to as "error vector" hereinafter) in the same direction at a high probability. Accordingly, when the detected vectors are significantly different from each other in their average direction and magnitude, the reliability of detected registration error is conceivably low. Although in the embodiment of FIG. 16 the screen is divided into four regions arranged in two row by two columns and an average vector for each region is calculated, the number of divided blocks may be arbitrary.

FIG. 17 is a block diagram of a reliability judging circuit based on the average vector. The circuit includes an error vector memory 90, an average vector calculating circuit 91, a vector subtracting circuit 92, and a threshold processing circuit 93. The calculating circuit 91 evaluates an average vector of error vectors stored in the memory 90. The subtracting circuit 92 evaluates the differences in the direction and magnitude between the average vector and individual vectors. The processing circuit 93 evaluates a differential vector and outputs to an output terminal 95 a signal representative of abandonment of the detecting result of the registration error when a detected vector is greatly different from the average vector. Similar to high analogy of the detected vectors within the screen, the analogy of a time direction at the same detection point is naturally high. Based on this fact, the analogy of the time direction at the same position is discriminated by comparing with the average vector in the time direction thereby to make judgement of abandonment in a case of a large difference, and the erroneous detection can be prevented.

Next, the arrangement and operation of the reliability judging circuit 53 which has been explained on FIG. 10 will be explained. A picture with extremely high correlation encounters a great difference between the maximum correlation value and the next largest correlation value. In another case of low correlation, which is unsuitable for the detection of the registration error, there is no significant difference between the first and second highest correlation values. Accordingly, by comparison of the first and second peaks of the correlation, when their difference is small, a detecting result abandoning signal is generated.

FIG. 18 is a block diagram showing an arrangement of the reliability judging circuit 53 in FIG. 10, and this is an embodiment of the circuit for comparing the largest and next largest correlation values. The figure also shows the memory 52 of FIG. 10 for the explanatory purpose. The circuit 53 includes a subtracting circuit 100 and a threshold circuit 101. Sums which provides the correlation values of the first and second orders are read out of the memory 52 which stores shift values and sums of the first to the Nth orders, and inputted to the subtracting circuit 100. The processing circuit 101 discriminates the subtracting result based on a threshold value. When the difference is small, a signal representative of abandonment of the detection result is outputted to an output terminal 56. There is another judging method, in which the number of sums for the second and the following peaks, difference of each of which from the first peak is smaller than a threshold value, are counted, and when the counted number exceeds a determined value, it is determined to be indicative of possible erroneous detection at high probability and a signal for abandoning the detection result may be generated.

Figure 19:
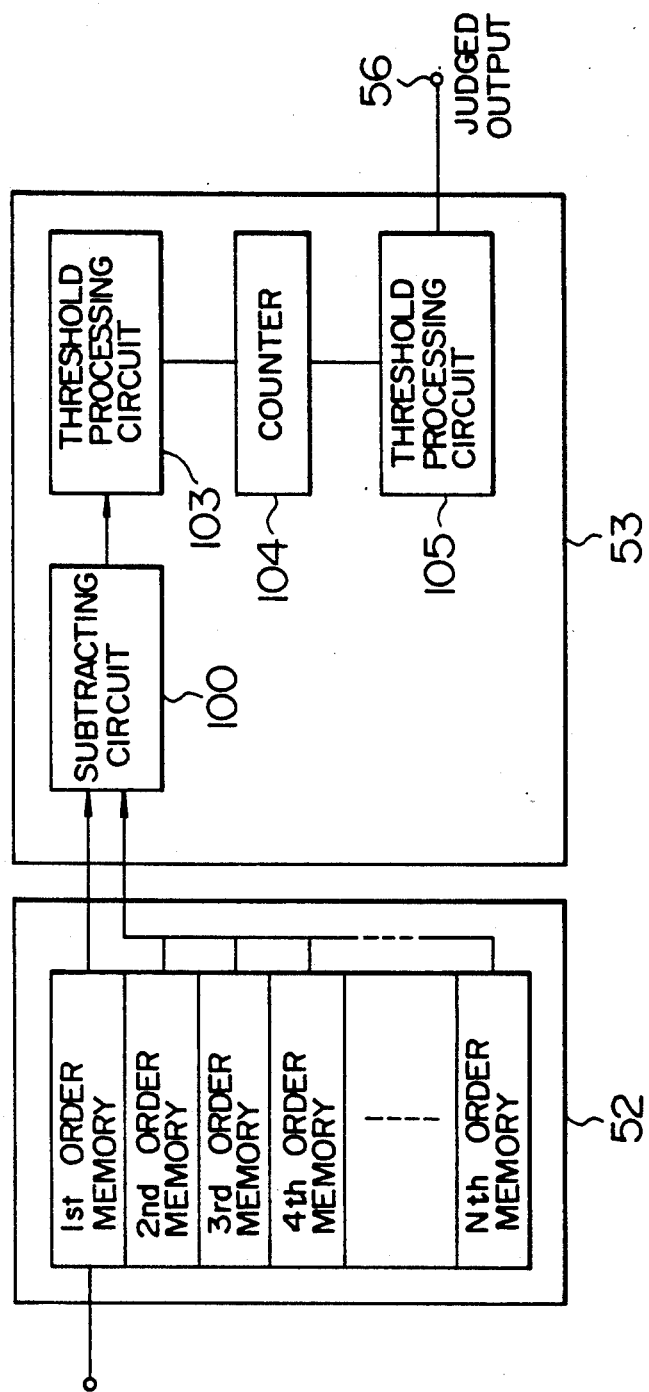

FIG. 19 shows an embodiment of the circuit for counting the number of small-difference sums. The circuit includes a subtracting circuit 100, threshold circuits 103 and 105, and a counter 104. From the memory 52 which stores correlation values and shift values, a sum of the highest correlation and sums of lower correlations are read out, and their difference signals are generated by the subtracting circuit 100. The difference signals are discriminated by the threshold circuit 103, and the discriminating results are counted by the counter 104. The number is discriminated by the threshold circuit 105, and in a case that it exceeds a preset value, a signal for abandoning the detection result of the registration error is generated and outputted to the output thermal 56.

The outputs resulting from the reliability judgement by the various judging circuits described above are collectively entered to the judging circuit 12 shown in FIG. 1. The judging circuit examples the four judging results. When the circuit makes a negative judgement for any of judging results, it abandones the detection result of the registration error. Based on this stringent judgement scheme, the probability of taking in the result of a detection error is lowered and the registration error can be detected from a usual object signal without deteriorating picture quality. The threshold values used in the various judgements are set appropriately so that no detection error arises for all pictures.

Figure 20:
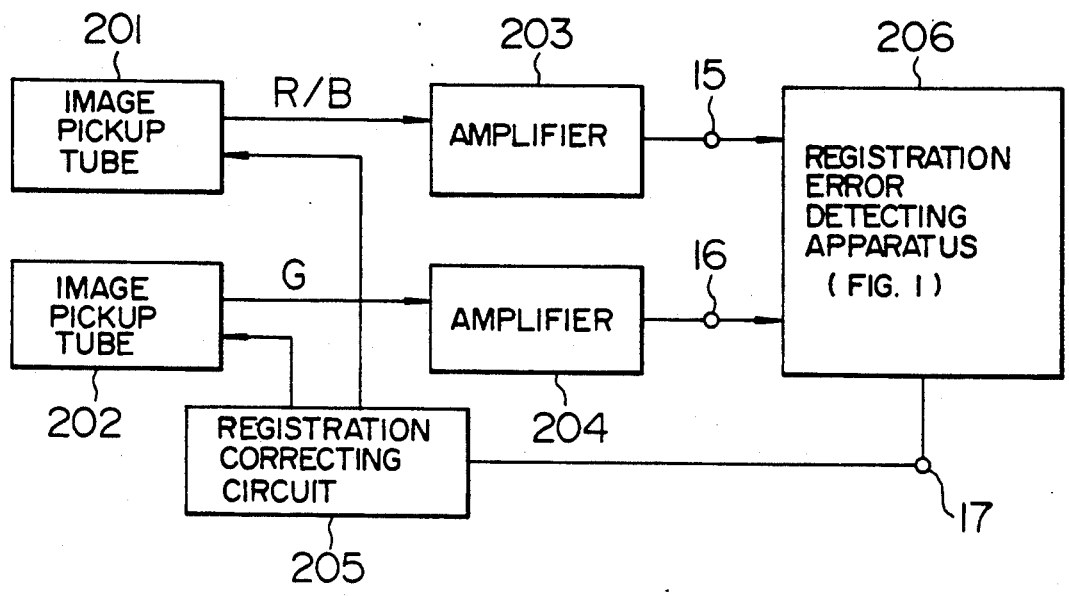
FIG. 20 is a block diagram showing an arrangement of a color imaging apparatus which uses the registration error detecting apparatus of this invention.

FIG. 20 is a block diagram showing an arrangement of a color imaging apparatus according to an embodiment of this invention using the foregoing registration error detecting apparatus. An image pickup tube 201 for the red (R) or blue (B) signal and an image pickup tube 202 for the green (G) signal have their output signals fed through respective amplifiers 203 and 204 to a registration error detecting apparatus 206, which is identical to that shown in FIG. 1. A signal of the registration error outputted from a output terminal 17 of the registration error detecting apparatus 206 is fed to a registration correcting circuit 205, and then applied as registration correcting signals to the deflection circuits of the image pickup tubes 201 and 202.

Figure 21:
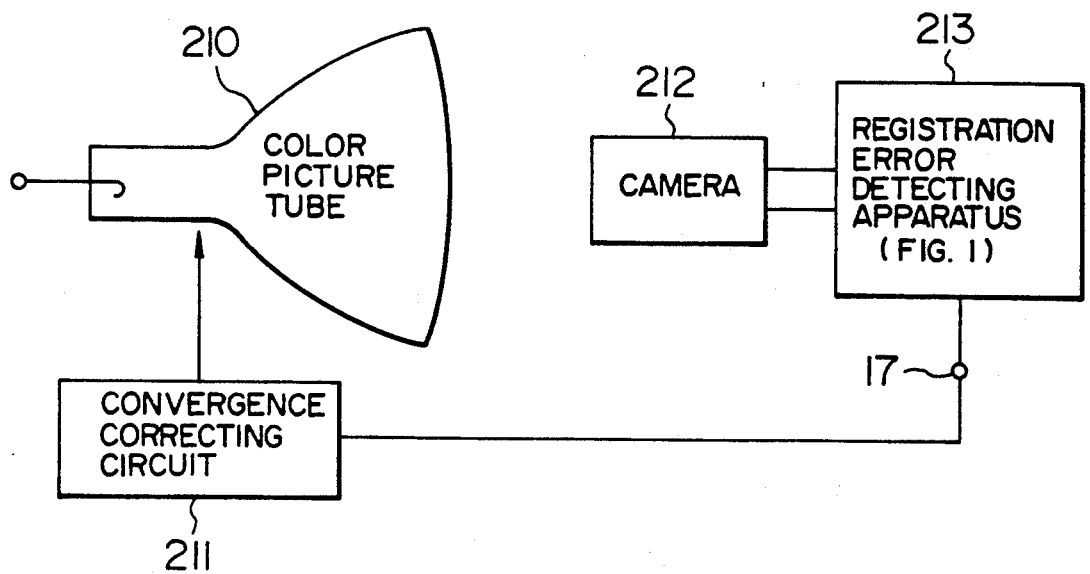
FIG. 21 is a block diagram showing an arrangement of a color display apparatus which uses the registration error detecting apparatus of this invention.

FIG. 21 is a block diagram showing an arrangement of a color display apparatus according to an embodiment of this invention using the foregoing registration error detecting apparatus. A color picture on a screen of a color picture tube 210 is imaged with a camera 212 which is free from registration error. An output signal of the camera 212 is fed to a registration error detecting apparatus 213 which is identical to that shown in FIG. 1. A signal of the registration error outputted from an output terminal 17 of the detecting apparatus 213 is fed to the color picture tube 210 through a convergence correcting circuit 211 so that the convergence adjustment is implemented.

Described above are embodiments of this invention. However, it is not confined to these embodiments. According to this invention, the correlation evaluating circuit which is indispensable for the registration error detection is arranged with an adding circuit that is suitable for simplifying the circuit, instead of using a multiplying circuit, whereby it is particularly useful for the real-time detection of the registration error during the operation of an imaging apparatus. The reliability of the detection is judged not only based on whether or not the detection region is a colored portion, but on the provision of several additional reliability judgement means, whereby the reliability of detection can be enhanced.

We claim:

1. An apparatus for detecting a registration error of a color image device, the apparatus comprising:

first and second memories for respectively storing first and second color component signal of the color image device, said first and second color component signals form a same frame of a picture;

an address generating circuit for generating a first read address of the first memory and a second read address of the second memory, the first read address being changed with a test mask, the second read address being changed within a reference mask in correspondence with the changing operation of the first read address within the test mask, and each time the address change operation is completed, the position of the test mask is shifted along two-dimensional directions relative to a position of the reference mask;

means for obtaining a differential signal indicating a difference between a signal read out from the first memory according to the first read address and a signal read out from the second memory according to the second read address, deriving an absolute value of the differential signal, summing-up the absolute value during an address change operation, and storing the summed-up absolute values each corresponding to a shift of the test mask; and means for detecting the registration error by determining a shift value of the test mask corresponding to a minimum value of the summed-up absolute values operation.

2. An apparatus according to claim 1, wherein said second means comprises means for shifting, for a plurality of adjacent pixels, relative positions of said first and second image component signals and summing absolute values of the differential signals evaluated by said first means in response to the shift operation.

3. An apparatus according to claim 1, further comprising fourth means for judging reliability of the detected registration error and removing ones having low-reliability from among signals of the registration error from said third means.

4. A color imaging apparatus using a plurality of image pickup devices comprising:
a registration error detecting apparatus for detecting a registration error;
said registration error detecting apparatus includes:
first and second memories for respectively storing first and second color component signals, said first and second color component signals form a same frame of a picture,
an address generating circuit for generating a first read address of the first memory and a second read address of the second memory, the first read address being changed within a test mask, the second read address being changed within a reference mask in correspondence with the changing operation of the first read address within the test mask, and each time the address change operation is completed, the position of the test mask is shifted along two-dimensional directions relative to a position of the reference mask;
means for obtaining a differential signal indicating a difference between a signal read out from the first memory according to the first read address and a signal read out from the second memory according to the second read address, deriving an absolute value of the differential signal, summing-up the absolute value during an address change operation, and storing the summed-up absolute values each corresponding to a shift of the test mask; and
means for detecting the registration error by determining a shift value of the test mask corresponding to a minimum value of the summed-up absolute values operation; and
means for detecting the registration error by determining a shift value of the test mask corresponding to a minimum value of the summed-up absolute values operation; and means for implementing registration correction based on an output of said registration error detecting apparatus.

5. A color display apparatus which displays at least two colors comprising:
a registration error detecting apparatus for detecting a registration error;
said registration error detecting apparatus includes:
first and second memories for respectively storing first and second color component signals, said first and second color component signals form a same frame of a picture,
an address generating circuit for generating a first read address of the first memory and a second read address of the second memory, the first read address being changed within a test mask, the second read address being changed within a reference mask in correspondence with the changing operation of the first read address within the test mask, and each time the address change operation is completed, the position of the test mask is shifted along two-dimensional directions relative to a position of the reference mask,
means for obtaining a differential signal indicating a difference between a signal read out from the first memory according to the first read address and a signal read out from the second memory according to the second read address, deriving an absolute value of the differential signal, summing-up the absolute value during an address changing operation, and storing the summed-up absolute values each corresponding to a shift of the test mask, and
means for detecting the registration error by determining a shift value of the test mask corresponding to a minimum value of the summed-up absolute values operation; and
means for implementing convergence correction based on an output of said registration error detecting apparatus.

6. A registration error detecting apparatus comprising:
means for detecting, based on correlation of at least two of a plurality of image component signals forming a same frame of picture, registration errors of said at least two image component signals;
means for judging reliability of the detected registration errors and removing information of registration errors having low reliability, wherein said reliability judgement means comprises at least one evaluating means including:
means for evaluating a statistic deviation value of signals in a specific frequency band of said image component signals,
means for averaging error values of two image component signals evaluated based on said correlation for each of a plurality of divided regions on the screen and evaluating differences of individual error values from the averaged error value,
means for examining, based on said correlation, the relations between the error value which yields a maximum correlation and error values of lower correlations, and
means for examining the variation in a time passage the error detection result at a same screen position for the registration error detected in said at least two image component signals, and evaluating the variation of registration error in the time passage; and
means for judging as to whether the detection result of registration error obtained from the correlation by said detection means is to be accepted or rejected, based on the output of said at least one assessment means.

7. An apparatus according to claim 6, wherein said detecting means comprises means for evaluating the absolute value of a differential signal between image signals derived from said two image component signals, and means for evaluating the correlation between said two image component signals by using the evaluated absolute differential signal.

8. A color imaging apparatus using a plurality of image pickup devices comprising:
a registration error detecting apparatus for detecting a registration error;
said registration error detecting apparatus includes:
means for detecting, based on correlation of at least two of a plurality of image component signals forming a same frame of picture, registration errors of said at least two image component signals,
means for judging reliability of the detected registration errors and removing information of registration errors having low reliability, wherein said reliability judgement means comprises at least one evaluating means including:

means for evaluation a statistic deviation value of signals in a specific frequency band of said image component signals, means for averaging error values of two image component signals evaluated based on said correlation for each of a plurality of divided regions on the screen and evaluating differences of individual error values from the averaged error value, means for examining, based on said correlation, the relations between the error value which yields a maximum correlation and error values of lower correlations, and means for examining the variation in a time passage the error detection result at a same screen position for the registration error detected in said at least two image component signals, and evaluating the variation of registration error in the time passage, and means for judging as to whether the detection result of registration error obtained from the correlation by said detection means is to be accepted or rejected, based on the output of said at least one assessment means; and means for implementing the registration correction based on the output of said registration error detecting apparatus.

9. A color display apparatus which displays at least two colors comprising:

a registration error detecting apparatus for detecting a registration error;

said registration error detecting apparatus includes:

means for detecting, based on correlation of at least two of a plurality of image component signals forming a same frame of picture, registration errors of said at least two image component signals;

means for judging reliability of the detected registration errors and removing information of registration errors having low reliability, wherein said reliability judgement means comprises at least one evaluating means including:

means for evaluating a statistic deviation value of signals in a specific frequency band of said image component signals, means for averaging error values of two image component signals evaluated based on said correlation for each of a plurality of divided regions on the screen and evaluating differences of individual error values from the averaged error value, means for examining, based on said correlation, the relations between the error value which yields a maximum correlation and error values of lower correlations, and means for examining the variation in a time passage the error detection result at a same screen position for the registration error detected in said at least two image component signals, and evaluating the variation of registration error in the time passage, and means for judging as to whether the detection result of registration error obtained from the correlation by said detection means is to be accepted or rejected, based on the output of said at least one assessment means; and means for implementing the convergence correction based on the output of said registration error detecting apparatus.

* * * * *